United States Patent [19]

Tsuchida

[11] Patent Number: 4,770,473
[45] Date of Patent: Sep. 13, 1988

[54] BRAKE DEVICE FOR VEHICLES

[75] Inventor: Tetsuo Tsuchida, Saitama, Japan

[73] Assignee: Honda Giken Kogyo Kabushiki Kaisha, Tokyo, Japan

[21] Appl. No.: 898,948

[22] Filed: Aug. 21, 1986

[30] Foreign Application Priority Data

Aug. 21, 1985 [JP] Japan .................. 60-183598
Aug. 21, 1985 [JP] Japan .................. 60-183601

[51] Int. Cl.⁴ ............................. B60T 8/46
[52] U.S. Cl. ................. 303/115; 188/181 A
[58] Field of Search .......... 188/181 A; 303/113, 303/115, 116, 117, 6 C

[56] References Cited

U.S. PATENT DOCUMENTS

| | | | |
|---|---|---|---|
| 31,387 | 9/1861 | Bayliss | 303/115 |
| 2,329,249 | 9/1943 | Carlson | 280/276 |
| 2,818,244 | 12/1957 | Ropar | 264/1 |
| 2,920,924 | 1/1960 | Reswick et al. | 303/24 |
| 2,954,237 | 9/1960 | Sampietro | 280/703 |
| 3,046,060 | 7/1982 | Stager et al. | 303/21 |
| 3,352,388 | 11/1967 | Lieber | 303/24 R |
| 3,403,761 | 10/1968 | Rockwell | 188/265 |
| 3,537,715 | 11/1970 | Gualdoni | 280/703 X |
| 3,542,145 | 11/1970 | Proffer | 180/219 |
| 3,556,613 | 1/1971 | Keller | 188/181 R |
| 3,655,016 | 4/1972 | Watanabe | 188/2 A X |
| 3,667,816 | 6/1972 | Harned | 303/21 |
| 3,731,767 | 5/1973 | Lefort | 188/72.2 |
| 3,829,166 | 8/1974 | von Loewis et al. | 303/21 CG |
| 3,908,805 | 9/1975 | Morse et al. | 188/181 A |
| 3,989,261 | 11/1976 | Kawaguchi | 188/272 X |
| 4,036,331 | 7/1977 | Hayashi et al. | 188/187 |
| 4,046,427 | 9/1977 | Baynes et al. | 303/115 |
| 4,050,748 | 9/1977 | Belart | 303/114 |
| 4,061,212 | 12/1977 | Blomberg | 188/180 |
| 4,114,460 | 9/1978 | Oto | 74/18.2 |
| 4,159,123 | 6/1979 | Petty | 188/272 X |
| 4,225,019 | 9/1980 | Blomberg | 188/181 R |
| 4,239,294 | 12/1980 | Burgdorf | 188/344 |
| 4,260,201 | 4/1981 | Farr | 188/181 A X |
| 4,274,518 | 6/1981 | Berisch | 188/344 |
| 4,281,881 | 8/1981 | Mekosh et al. | 303/99 |
| 4,289,359 | 9/1981 | Lüpertz et al. | 188/344 |
| 4,336,859 | 6/1982 | Leitner | 180/226 |
| 4,340,258 | 7/1982 | Farr | 303/115 |
| 4,350,396 | 9/1982 | Mortimer | 303/115 |
| 4,353,440 | 10/1982 | Farr | 18/181 A |
| 4,354,715 | 10/1982 | Farr et al. | 303/116 |
| 4,355,849 | 10/1982 | Wilson | 303/116 |
| 4,365,538 | 12/1982 | Andoh | 91/1 |
| 4,377,221 | 3/1983 | Farr | 188/181 A |
| 4,381,049 | 4/1983 | Crossman | 188/72.7 |
| 4,381,125 | 4/1983 | Wilson | 303/116 |

(List continued on next page.)

FOREIGN PATENT DOCUMENTS

| | | |
|---|---|---|
| 0495146 | 8/1953 | Canada . |
| 55-14295 | 4/1980 | Japan . |
| 55-45421 | 11/1980 | Japan . |
| 57-33052 | 2/1982 | Japan . |
| 676708 | 7/1952 | United Kingdom . |
| 778765 | 7/1957 | United Kingdom . |
| 894577 | 4/1962 | United Kingdom . |
| 895294 | 5/1962 | United Kingdom . |
| 1121561 | 7/1968 | United Kingdom . |
| 1142500 | 2/1969 | United Kingdom . |
| 1159592 | 7/1969 | United Kingdom . |
| 1252674 | 11/1971 | United Kingdom . |
| 1376042 | 12/1974 | United Kingdom . |
| 1496721 | 12/1977 | United Kingdom . |
| 2069641 | 2/1981 | United Kingdom . |
| 2069639 | 2/1981 | United Kingdom . |
| 2069642 | 8/1981 | United Kingdom . |
| 2069641A | 8/1981 | United Kingdom . |
| 2070166A | 9/1981 | United Kingdom . |
| 2109494 | 6/1983 | United Kingdom . |
| 2120336 | 11/1983 | United Kingdom . |

Primary Examiner—Duane A. Reger
Attorney, Agent, or Firm—Lyon & Lyon

[57] ABSTRACT

A brake device having an antilock controller comprising a hydraulic pump which is reciprocated through a cam by an output shaft responsive to rotation of a wheel to produce a hydraulic pressure for controlling a braking pressure of the wheel, and a sensor which senses, by the overrunning rotation of a flywheel, the situation that the locking of the wheel is restored when the wheel is braked, to produce a signal, wherein the cam of the hydraulic pump and the flywheel of the sensor are arranged adjacent to each other on the output shaft within a hub of the wheel.

6 Claims, 6 Drawing Sheets

U.S. PATENT DOCUMENTS

| | | | |
|---|---|---|---|
| 4,387,934 | 6/1983 | Farr | 303/115 |
| 4,401,348 | 8/1983 | Farr | 303/116 |
| 4,405,006 | 9/1983 | Preusker | 152/170 |
| 4,405,181 | 9/1983 | Resch et al. | 303/9 |
| 4,408,673 | 10/1983 | Leiber | 180/141 |
| 4,414,630 | 11/1983 | Harris et al. | 364/426 |
| 4,416,353 | 11/1983 | Ivanov | 188/2 A |
| 4,421,359 | 12/1983 | Hayashi et al. | 303/6 A |
| 4,422,695 | 12/1983 | Farr | 303/115 |
| 4,428,624 | 1/1984 | Farr | 303/116 |
| 4,437,678 | 3/1984 | Schultz | 280/703 X |
| 4,445,585 | 5/1984 | Imani | 180/219 |
| 4,456,309 | 6/1984 | Rath | 188/181 A X |
| 4,456,310 | 6/1984 | Hayashi et al. | 303/119 |
| 4,457,563 | 7/1984 | Farr | 303/92 |
| 4,465,322 | 8/1984 | Hayashi | 303/6 A |
| 4,474,413 | 10/1984 | Farr | 303/116 |
| 4,475,774 | 10/1984 | Davis | 303/112 |
| 4,492,284 | 1/1985 | Hayashi | 180/219 |
| 4,494,800 | 1/1985 | Hayashi | 303/6 A |
| 4,515,384 | 5/1985 | Honma et al. | 280/276 |
| 4,552,373 | 11/1985 | Kawaguchi et al. | 280/703 X |
| 4,564,244 | 1/1986 | Reinartz et al. | 303/6 C |
| 4,572,317 | 2/1986 | Isono et al. | 180/227 |
| 4,602,705 | 7/1986 | Farr | 188/181 A |

BRAKE DEVICE FOR VEHICLES

BACKGROUND OF THE INVENTION

1. Field of the invention

The present invention relates to brake devices for vehicles such as motorcycles, automobiles, etc., and more particularly to a brake device provided with an antilock controler, which comprises a transmission gear connected to a wheel; a sensor having a flywheel driven by said transmission gear and sensing, by an overrunning rotation of the flywheel, the situation that the wheel is about to lock when the wheel is braked by a wheel brake, to produce an output signal; a hydraulic pump driven by the transmission gear; a modulator which has a hydraulic control chamber communicated with an outlet chamber of the hydraulic pump and is interposed in a braking oil passage between a master cylinder and a wheel brake to reduce and restore a braking hydraulic pressure of the wheel brake in response to a decrease and increase in pressure of the hydraulic control chamber; and a noramlly closed type exhaust pressure valve interposed in a communicating passage between the control hydraulic pressure chamber and an oil reservoir, the valve being opened upon receipt of the output signal from the sensor.

2. Description of the Prior Art

One such brake device has been known as disclosed for example in Japanese Patent Application Laid-Open No. 120,440/1981.

In the conventional brake device, an output shaft of a transmission gear is carried on a casing through bearings at the end and intermediate portion in the outer periphery thereof, and a driving cam of a hydraulic pump and a flywheel of a sensor are arranged on the output shaft having the bearing at the intermediate portion sandwiched therebetween. Therefore the adjacent arrangement of the hydraulic pump and sensor is limited, which poses a trouble in miniaturizing the antilock control device. In addition, since the transmission gear and sensor are disposed externally of the wheel, there has been suffered from a problem that the whole brake system becomes larger in size.

SUMMARY OF THE INVENTION

The present invention has been accomplished in view of the circumstances as described above. It is an object of the invention to miniaturize the antilock control device by making it possible to provide the adjacent arrangement of the hydraulic pump and sensor, and to provide the compact brake device by making it possible to encase the transmission gear and sensor into a hub of the wheel.

For achieving the above-described object, the present invention is characterized in that the transmission gear and sensor are encased within the hub of the wheel. a tubular output shaft of the transmission gear is rotatably carried in the outer periphery of an axle supporting the hub, the flywheel is carried in the outer periphery of the output shaft so that the flywheel may be overrun-rotated, and in the outer periphery of the output shaft the cam for driving the hyraulic pump is disposed adjacent to the flywheel.

Since the tubular output shaft of the transmission gear is supported in the outer periphery of the axle, there can be obtained a large space on the output shaft which is not obstructed by the casing. In that space the cam and the flywheel may be arranged adjacent to each other. Accordingly, the adjacent arrangement of the hydraulic pump and sensor is rendered possible to achieve the miniaturization of the antilock brake device.

Furthermore, since the transmission gear and sensor are disposed in the space within the hub of the wheel, the antilock control device is not excessively projected outside the wheel, thus achieving the substantial miniaturization of the whole brake device.

The above and other objects, features and advantages of the present invention will be apparent from the description of the preferred emdbodiments which will be described in detail in conjunction with the accompanying drawings.

BRIEF DESCRIPTION OF THE DRAWINGS

The drawings show the preferred embodiments of the present invention.

DESCRIPTION OF THE PREFERRED EMBODIMENTS

Several preferred embodiments of the present invention will be described with reference to the drawings.

Figure 1:
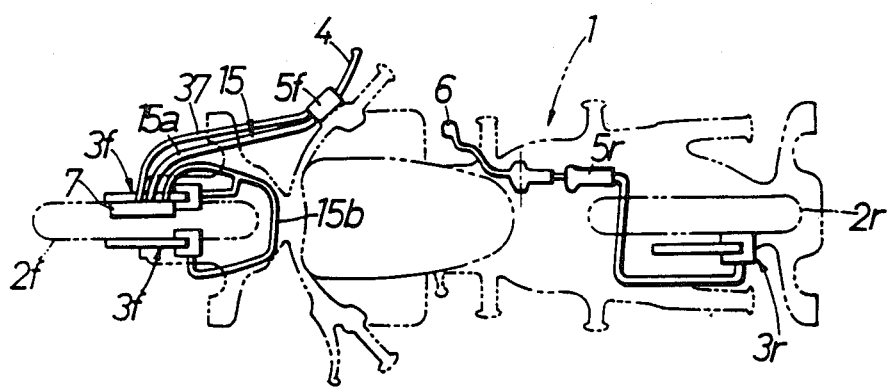
FIG. 1 is a schematic plan view of a motorcycle provided with a brake device with an antilock control device in accordance with a first embodiment.

First, FIGS. 1 through 4 show a first embodiment. Referring to FIG. 1, a motorcycle 1 has a pair of front right and left wheel brakes 3f, 3f for braking a steering iront wheel 2f and a single rear wheel brake 3r for braking a rear wheel 2r of the motorcycle 1. The front brakes 3f are operated by the output of hydraulic pressure from a front master cylinder 5f operated by a brake lever 4. The rear brake 3r is operated by the output of hydraulic pressure from a rear master cylinder 5r which is actuated by a brake pedal 6. Particularly, the hydraulic pressure to the front brakes 3f are controlled by an antilock conroller 7.

Figure 2:
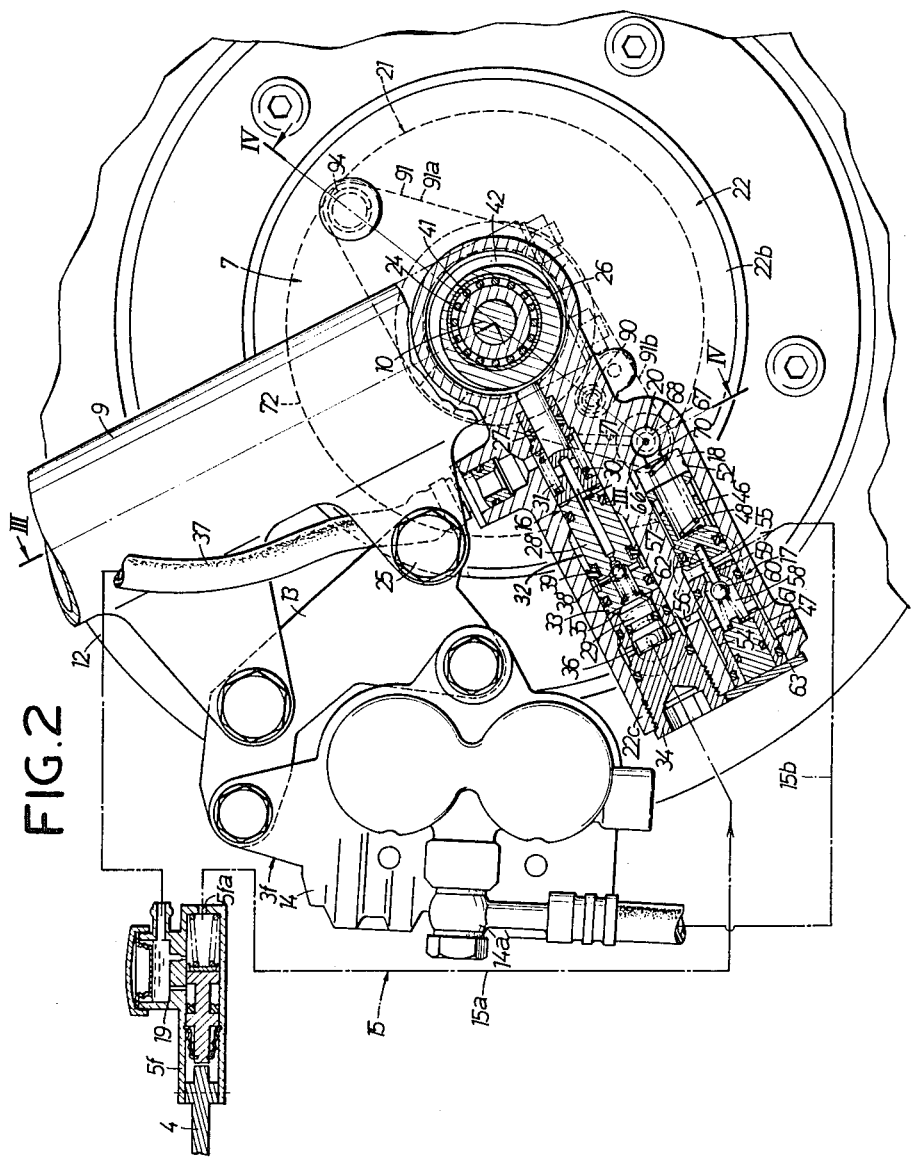
FIG. 2 is a side elevation showing essential parts of the brake device with an antilock control device.
Figure 3:
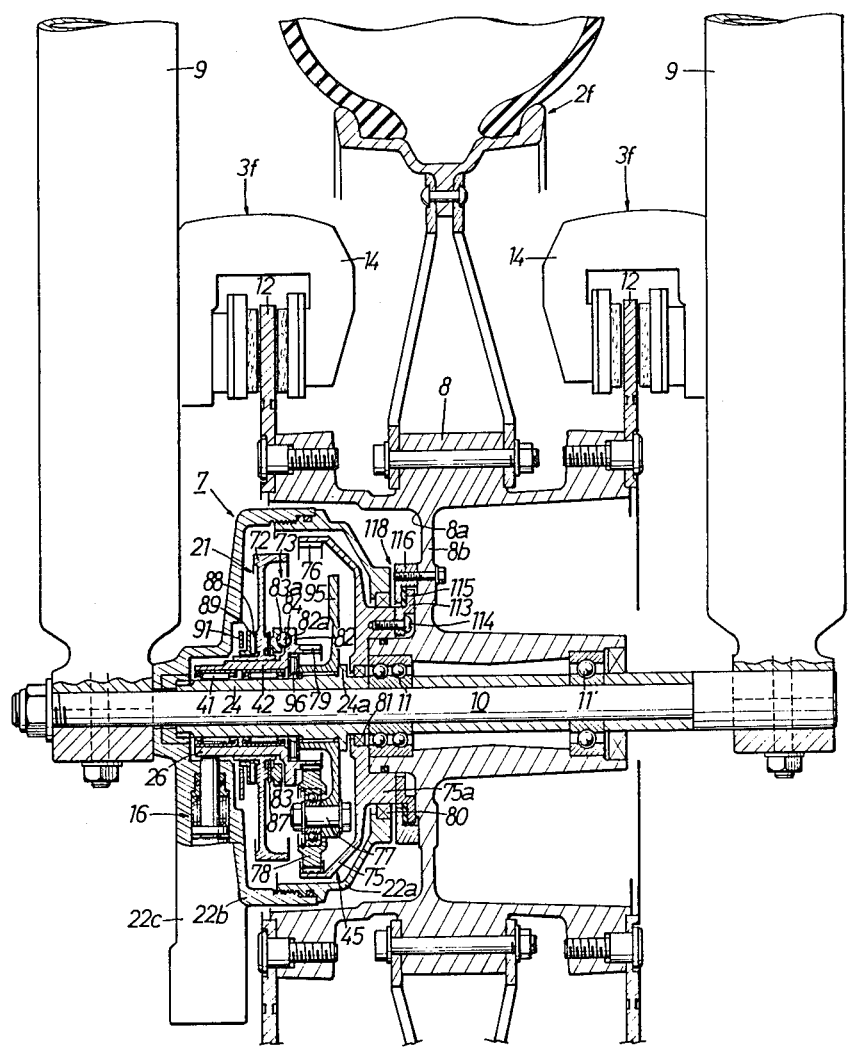
FIGS. 3 and 4 are sectional views taken on lines III—III and IV—IV, respectively, of FIG. 2.
Figure 4:
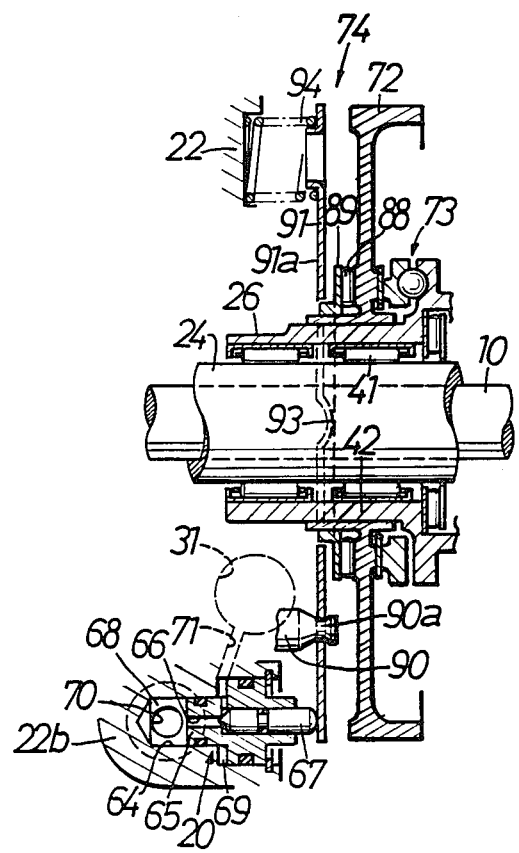

Turning now to FIGS. 2 through 4, a hub 8 of the wheel 2f is supported through two bearings 11 on an axle 10. The axle 10 is secured to the lower ends of a front fork 9. Each of the brakes 3f includes a brake disc 12 securely fixed to the end face of the hub 8 and a brake caliper 14 straddling the disc 12 and supported by a bracket 13 to the front fork 9. The caliper 14 operates to grip the brake disc 12 when the output of hydraulic pressure from the master cylinder 5f is supplied to the input port 14a. In this way, a braking force is applied to the wheel 2f.

The antilock controller 7 is functionally interposed in the hydraulic conduit 15 coupled between the output port 5fa of the master cylinder 5f and the input port 14a of the caliper 14.

The controller 7 includes within a common casing 22 a hydraulic pump 16 driven by the wheel 2f, a modulator 17 having a hydraulic control chamber 18 to receive the discharge pressure of the pump 16 and disposed in the midst of the conduit 15, a normally closed exhaust pressure valve 20 interposed in a passage between the chamber 18 and an oil reservoir 19, and an inertia type sensor 21 which opens the valve 20 when an angular deceleration exceeding a predetermined value of the front wheel 2f is sensed.

The casing 22 has a cup-shaped inner casing 22a and an outer casing 22b, open ends of which are threadedly connected. The casing 22b has the end wall integrally formed with a radially outwardly extending portion 22c. The casing 22 except the extended portion 22c is positioned at a recess 8a formed in the left end face of the hub 8. The casing 22b is fitted and supported in the outer periphery of the left end of a cylindrical shaft 24 juxtaposed the bearing 11 and fitted in the axle 10. The casing 22b is also connected to the front fork 9 by means of an attachment mechanism so as not to rotate about the axle 10. The attachment mechanism may be of conventional construction as, for example, bolts 25, illustrated in FIG. 2, for clamping a bracket 13 to the front fork 9.

The pump 16 includes an eccentric cam 26 formed at the left end of an output shaft 42 of an accelerating gear unit 45 which will be described later, a pushrod 27 arranged with its inner end following on the cam 26, a pump piston 28 in contact with the outer end of the pushrod 27, an operating piston 29 in contact with the outer end of the pump piston 28 and a return spring 30 arranged to bias the pushrod 27 away from the cam 26.

The push rod 27 and the pump piston 28 are arranged within a first cylindrical hole 33 formed in the extended portion 22c. The rod and piston 28 slidably arranged within the cylindrical hole 33 define an inlet chamber 31 and an outlet chamber 32 arranged in annular spaces about the rod 27 and pump piston 28, respectively. A plug 34 is fitted into the outer end of the hole 33 to define a pump chamber 35 at the end of the piston 28. The piston operating 29 is slidably arranged within the plug 34 so as to form a hydraulic chamber 36 in the plug 34.

The inlet chamber 31 communicates with the fluid reservoir 19 through a conduit 37. This chamber 31 further communicates through a suction valve 38 with the pump chamber 35. The pump chamber 35 in turn communicates with the outlet chamber 32 through a unidirectional sealing member 39. The sealing member 39 provides a discharge valve function. The hydraulic chamber 36 is connected to the upstream conduit 15a of the hydraulic conduit 15. The chamber 36 is thus always in communication with the output port 5fa of the master cylinder 5f.

The modulator 17 includes a pressure reducing piston 46, a stationary piston 47 abutting one end of the pressure reducing piston 46 to restrict the backward movement thereof, and a return spring 48 for biasing the pressure reducing piston 46 into contact with the stationary piston 47. Both the pistons 46 and 47 are disposed within a second cylindrical hole 52 which is formed adjacent the first cylindrical hole 33 in the extended portion 22c.

In the second cylindrical hole 52, the pressure reducing piston 46 defines the control hydraulic chamber 18 at the inner end wall of the cylindrical hole 52 and defines an output hydraulic chamber 55 against the piston 47. Around the outer periphery of the piston 47, an input hydraulic chamber 54 is arranged which communicates with the chamber 36 of the pump 16 through an oil passage 56. The output hydraulic chamber 55 is connected with the downstream conduit 15b of the conduit 15 so that the chamber 55 is always in communication with the input port 14a of the brakes 3f. The control hydraulic chamber 18 communicates with the outlet chamber 57 of the pump 16 through an oil passage 57.

The piston 47 includes a valve chamber 58 which is always in communication with the input hydraulic pressure chamber 54 and a valve port 59 for communication between the valve chamber 58 and the output hydraulic chamber 55. The valve chamber 58 encases therein a valve body 60 capable of opening and closing the valve port 59 and a valve spring 61 for biasing the valve body 60 to the closed position at the port 59. A valve opening rod 62 controls the valve body 60. This opening rod extends from one end of the pressure reducing piston 46 and maintains the valve body 60 in the open state when the piston 46 is disposed at its retracted limit.

The outer end of the second cylindrical hole 52 is closed by an end plate 63 secured to the extended portion 22c. The stationary piston 47 axis extends into contact with the end plate 63 by the resilient force of the spring 48 or by the hydraulic pressure introduced into the chambers 54 and 55.

The hydraulic pump 16 and the modulator 17 are disposed on the back side of the front fork 9 in a similar arrangement to that of the caliper 14.

The exhaust pressure valve 20 includes a valve seat member 65 which is engaged within a stepped cylindrical hole 64 of the outer casing 22b and a valve body 67 slidably arranged within the member 65 to open or close the valve hole 66. The member 65 defines an inlet chamber 68 in the reduced diameter portion of the stepped cylindrical hole 64 and an outlet chamber 69 in the enlarged diameter portion of the stepped cylindrical hole 64. The chambers 68 and 69 communicate through the port 66. The chamber 68 communicates with the chamber 18 of the modulator 17 through an oil passage 20. The chamber 69 communicates with the chamber 31 of the pump 16 through an oil passage 71. Therefore, eventually the chamber 69 communicates with the oil reservoir 19.

The sensor 21 includes a flywheel 72 rotated through the accelerating gear unit 45 as a transmission device deriving input from the front wheel 2f, a cam mechanism 73 for converting the overrunning rotation of the flywheel 72 into an axial displacement, and an output lever mechanism 74 for controlling operation of the exhaust pressure valve 20 in response to the axial displacement of the flywheel 72, which elements are all disposed within the casing 22.

The gear unit 45 includes a cup-shaped input member 75 disposed within the casing 22 with the open end directed toward the outer casing 22b, a ring gear 76 which is engraved around the inner periphery of the open end of the input member 75, a planetary gear 78 which is rotatably supported on shafts 77 to a support plate 95 connected by means of a spline to the outer periphery of the cylindrical shaft 24 to engage with the ring gear 76, and a cylindrical output shaft 42 integrally formed on the outer periphery on the right end of a sun gear 79 meshed with the planetary gear 78. The output shaft 42 is rotatably supported in the outer periphery of the cylindrical shaft 24 through a needle bearing 41 and supported at its right end face by the support plate 95 through a thrust bearing 96. The support plate 95 is supported at its right end face by a flange 24a projected in the outer periphery of the cylindrical shaft 24.

For preventing rotation of the support shaft 95, the left end of the cylindrical shaft 24 spline-coupled to the support plate 95 is spline-coupled to the fixed outer casing 22b.

A short cylindrical portion 75a extending through the end wall of the inner casing 22a is integrally projected on the end wall of the input member 75. A connection flange 113 is fixedly secured by means of screws 114 to the end of the cylindrical portion 75a.

The flange 113 is rotatably fitted in a boss 8c extended from the center on the left side of a vertical partitioning wall 8b within the hub 8. The flange 113 is further clamped by the wall 8b and a connection ring 116 through a resilient frictional member 115 formed of rubber, synthetic resin, etc.

The connection ring 116 is rotatably fitted in the outer peripheral surface of the flange 113 and has an L-shape in section so as to opposed to the inner face thereof with a certain space therebetween. The ring 116 is fixedly secured by means of a plurality of bolts 117 (only one of which is shown) to the central wall 8b. The resilient frictional member 115 is mounted in said space with a predetermined set load. In this way, the flange 13, the ring 116 and the frictional member 115 constitute a transmission torque restricter 118.

A sealing member 80 and a sealing member 81 are interposed, for sealing the interior of the casing 22, between the cylindrical portion 75a and the end wall of the inner casing 22a and between the end wall of the input member 75 and the cylindrical shaft 24, respectively.

The cam mechanism 73 includes a drive cam plate 82 which is formed integral with the output shaft 42 adjacent to the sun gear 79, a driven cam plate 83 rotatably arranged opposite to the plate 82, and a plurality of thrust balls 84 which are engaged with plural pairs of cam recesses 82a and 83a formed on the opposing surfaces of the plates 82 and 83. In the normal case where the drive cam plate 82 is in the driving side relative to the driven cam plate 83, the thrust balls 84 are engaged with the deepest portions of the recesses 82a. In this position, rotary torque received from the shaft 42 by the cam plate 82 is simply transmitted to the cam plate 83. Under these conditions, no relative rotation occurs between the cam plates 82 and 83. Conversely, when the cam plate 83 is overrun relative to the cam plate 82, relative rotation occurs between the cam plates 82 and 83. As a result, the thrust balls 84 roll within each recess to a shallower position to provide the cam plates 82 and 83 with thrust. As a result, the driven cam plate 83 is axially displaced in a direction away from the drive cam 82.

The flywheel 72 is rotatably and slidably supported on the output shaft 42 and is engaged with the left side of the driven cam plate 83 through a friction clutch plate 87. A pressure plate 89 is provided through a thrust bearing 88 on the left side of the flywheel 72.

The output lever mechanism 74 includes a supporting shaft 90 which projects from the inner surface of the outer casing 22b at an intermediate position between the axle 10 and the exhaust pressure valve 20, and a lever 91 loosely supported in the axial direction of the axle 10 at a neck 90a at the end of the shaft 90. The lever 91 is composed of a long first arm 91a which extends around the shaft 42 from the supporting shaft 90, and a short second arm 91b which extends from the shaft 90 toward the valve 20. Midway on the arm 91a, a portion thereof is raised to define an abutment portion 93 which abuts against the outside surface of the plate 89.

A return spring 94 is interposed in a compressed state between the end of the first arm 91a and the casing 22b. The end of the second arm 91b abuts the outer end of the valve body 67 of the valve 20.

The resilient force of the spring 94 acts on the lever 91 to press the abutment portion 93 of the arm 91a against the plate 89 which in turn presses the arm 91b against the valve body 67 of the valve 20 to hold the valve body 67 in a closed state. And the resilient force which the plate 89 receives from the spring 94 provides the flywheel 72, the clutch plate 87 and the cam plate 83 with a predetermined frictional engagement force. This force acts to press the plates 82 and 83 toward one another.

The frictional engaging force is set such that the clutch plate 87 slips when the rotary torque between the cam plate 83 and the flywheel 72 exceeds a predetermined level.

The operation of the above-described embodiment will be described.

When the vehicle is running, the rotation of the front wheel 2f is transmitted from the hub 8 to the input member 75 through the ring 116, the frictional member 115 and the flange 113. The rotation of the wheel 2f is further transmitted to the output shaft 42 while being accelerated by the ring gear 76, the planetary gear 78 and the sun gear 79 and then transmitted through the cam mechanism 73 and the friction clutch 87 to the flywheel 72 to drive the latter. Thus, the flywheel 72 is rotated at a speed faster than the front wheel 2f. This provides additional rotary inertia to the flywheel 72.

At the same time, the eccentric cam 26 is also rotated along with the output shaft 42.

During the driving as described above, when an overload is applied to the sensor 21 for some reason, the slip occurs between the ring 116 and the friction member 115 or between the member 115 and the flange 113. The torque transmitted from the hub 8 to the input member 75 is held at a level less than a predetermined value. As a result, the action of overload to the sensor 21 can be prevented.

When the master cylinder 5f is operated to brake the wheel 2f, the hydraulic pressure output is transmitted sequentially through the upstream conduit 15a of the conduit 15, the chamber 36 of the pump 16, the chamber 54 of the modulator 17, the chamber 58, the valve port 59, the chamber 55 and the downstream conduit 15b of the conduit 15 to the front brake 3f. Braking force is thus applied to the wheel 2f.

In the pump 16, the output hydraulic pressure of the master cylinder 5f is introduced to the chamber 36. Thus, the pump piston 28 is reciprocated by the action of the hydraulic pressure on the operating piston 29 and the lifting action of the push rod 27 responsive to the eccentric cam 26. During the suction stroke of the pump piston 28 when the piston moves toward the pushrod 27, the valve 38 is opened and the oil from the reservoir 19 is sucked through the conduit 37 and the chamber 31 to the chamber 35. During the discharge stroke of the piston 28 with the piston 28 moving the operating piston 29, the sealing member 39 open to feed the hydraulic fluid in the chamber 35 to the chamber 32 and further through the oil passage 57 to the chamber 18 of the modulator 17. When the pressures of the chambers 32 and 18 rise to a predetermined level, the piston 28 is held in contact with the plug 34 by the pressure of the chamber 32.

Since the communication between the chamber 18 of the modulator 17 and the reservoir 19 is initially interrupted by the closing of the exhaust pressure valve 20, the hydraulic pressure supplied from the pump 16 to the chamber 18 acts directly on the pressure reducing piston 46 to press the same to its retracted position. Thus, the valve body 60 is held in the valve open state by the rod 62. This allows the output hydraulic pressure of the master cylinder 5f to pass therethrough.

The brake force applied to the brakes 3f becomes proportional to the hydraulic pressure of the cylinder 5f at the initial stage of braking.

When an angular deceleration is generated by the wheel 2f in response to the braking, the flywheel 72 senses the deceleration and tends to overrun the driveshaft 42 by the stored inertial force in the flywheel 72. The relative movement of the flywheel 72 under this condition produces relative rotation between the cam plates 82 and 83 to axially displace the flywheel 72 by the thrust generated by the rolling of the thrust balls 84. In turn, the plate 89 is forced axially to push the lever 91. At the stage the wheel 2f is not possibly locked, the angular deceleration of the wheel 2f is so low as not to swing the lever 91.

However, when the wheel 2f is about to lock due to excessive brake force or a decrease in the frictional coefficient of the road surface, the pressing force of the plate 89 exceeds a predetermined value. This results from the abrupt increase in the angular deceleration of the wheel 2f. As a result, the lever 91 rocks about the shaft as a fulcrum to compress the spring 94. The arm 91b of the lever 91 rocks to separate the valve body 67 at the same time that the spring 94 is being compressed. Consequently, the exhaust pressure valve 20 is opened.

When the valve 20 opens, the hydraulic pressure in the chamber 18 is exhausted through the passage 70, the chamber 68, the port 66, the chamber 69, the passage 71, the chamber 31 of the pump 16 and the conduit 37 to the reservoir 19. Consequently, the piston 46 is returned by the hydraulic pressure of the chamber 55 toward the chamber 18 against the tension of the spring 48. As a result, the rod 62 is retracted to close the valve body 60. The valve body 60 then interrupts the communication between the chambers 54 and 55 and increases the volume of the chamber 55. The brake hydraulic pressure acting on the brakes 3f then decreases to reduce the brake force of the wheel 2f. The reduction in the brake force results in the avoidance of locking. With reduction in the braking force, the wheel 2f is again accelerated. The pressing force of the plate 89 against the lever 91 decreases and the lever 91 rocks toward the at-rest position by the force of the spring 94. Consequently, valve 20 is able to close. When valve 20 closes, the hydraulic oil discharged from the pump 16 is immediately sealed in the chamber 18. The piston 46 then retracts toward the chamber 55 to raise the hydraulic pressure in the chamber 55. This again increases brake force. This operation is repeated at high frequency whereby the effective braking of the wheel 2f can occur.

In the antilock braking system as described above, the cylindrical output shaft 42 is supported in the outer periphery of the axle 10 through the shaft 24 and the needle bearing 41. There can be obtained a large space not interrupted by the casing 22. The cam 26 and the flywheel 72 may be arranged adjacent to each other. As a result, the pump 16 and the sensor 21 may be arranged adjacent to each other.

Since a major portion of the casing 22 housing the accelerating gear unit 45 and the sensor 21 is disposed in the recess 8a of the hub 8 of the wheel 2f, the antilock controller 7 is not greatly projected outside the wheel 2f.

Figure 5:
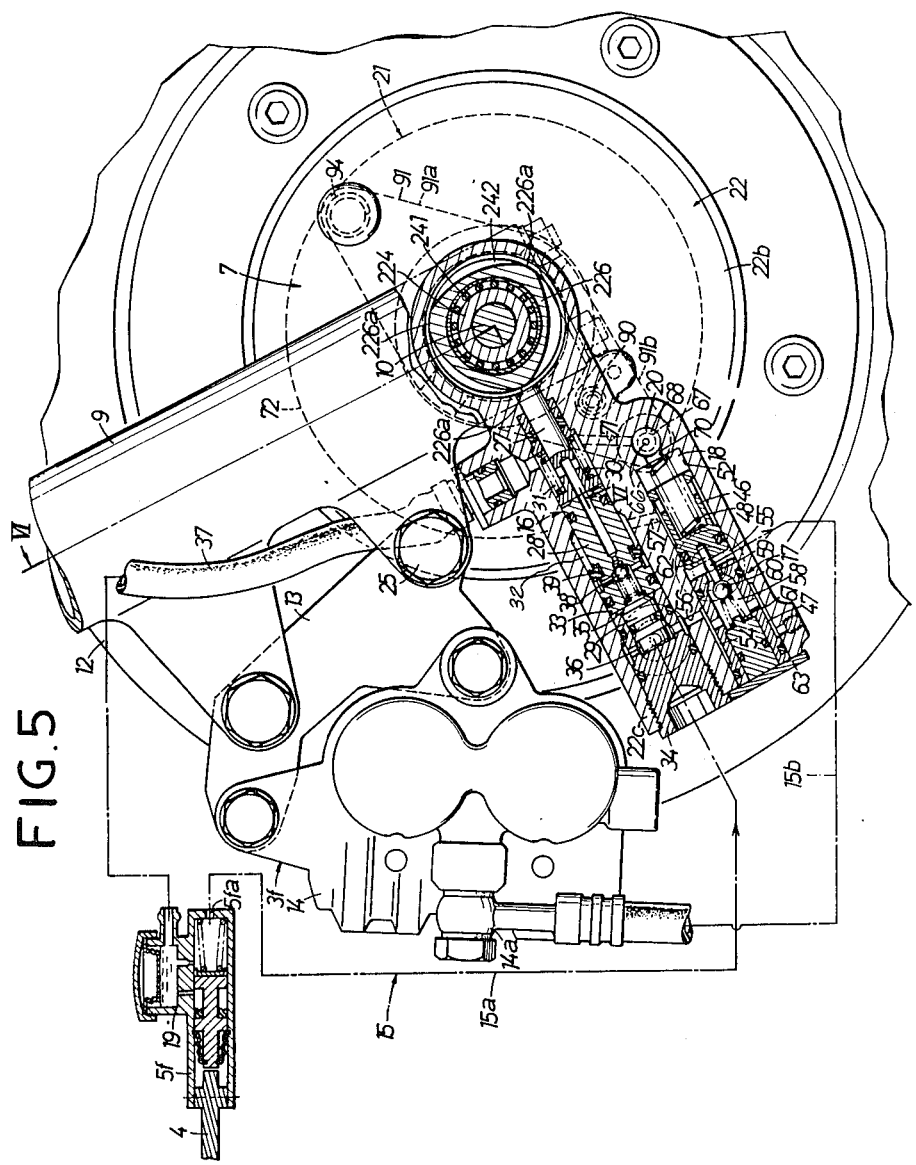
FIG. 5 is a side elevation similar to FIG. 2 showing the essential parts of the brake device with an antilock control device according to a second embodiment.
Figure 6:
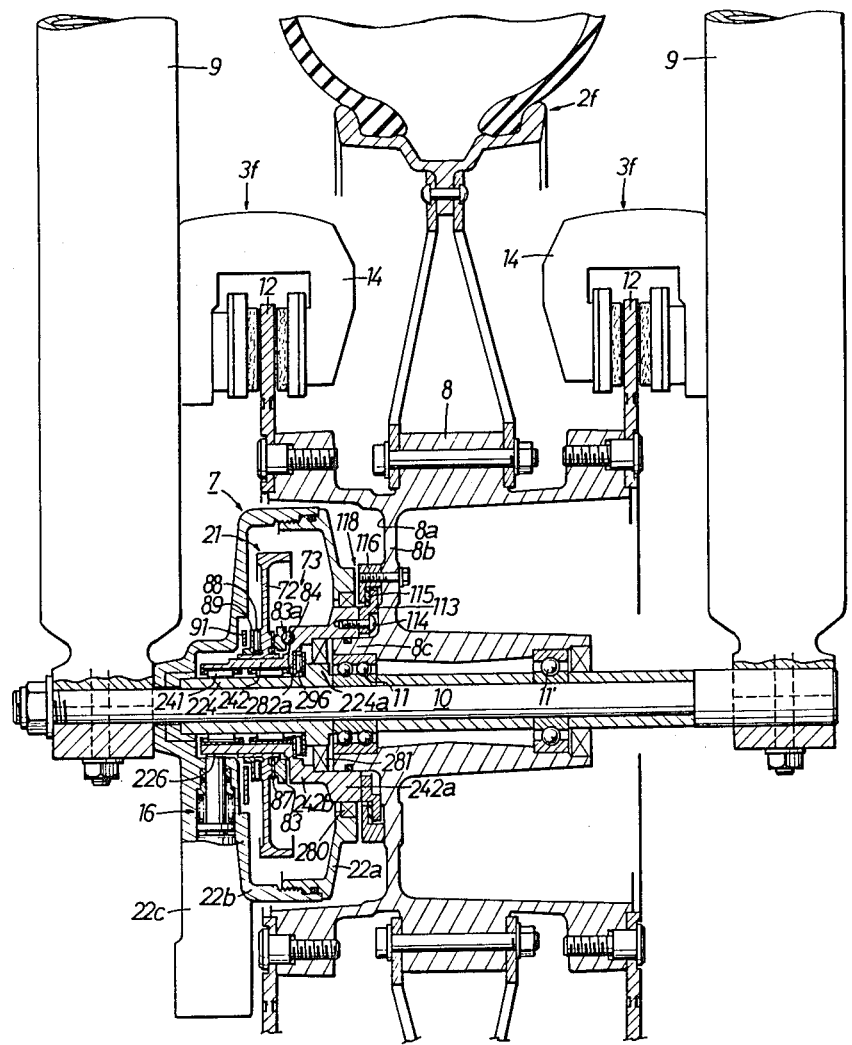
FIG. 6 is a sectional view taken on line VI—VI of FIG. 5.

FIGS. 5 and 6 show a second embodiment of the present invention in which elements corresponding to those of the first embodiment will be indicated by corresponding numbers.

In the second embodiment, the gear unit of the first embodiment is omitted. An output shaft 242 is rotatably supported on the axle 10 through a cylindrical shaft 224 and a bearing 241. The output shaft 242 is connected at the right end to the hub 8 through only a transmission torque restricter 118. That is, the output shaft 242 is integrally formed at the right end with a cylindrical boss 242a enlarged in diameter. The boss 242a extends through the end wall of the inner casing 22a and is fitted in the outer periphery of the boss 8c of the hub 8. The boss 242a is directly securely fixed by means of screws 114 to the flange 113 of the torque restricter 118.

The output shaft 242 is provided with an intermediate stepped portion 242b connected to the cylindrical boss 242a. The stepped portion 242b has a side face opposed to a recess 83a of a driven cam plate 83 at a position where the output shaft 242 is assembled. The side face is provided with a recess 282a which cooperates with the recess 83a to hold a thrust ball 84. The output shaft 242 is supported through a bearing 296 on a flange 224a projected in the outer periphery at the right end of the shaft 224 so that an axial rightward movement thereof is defined.

A cam 226 of the pump 16 is integrally formed on the outer peripheral portion at the left end of the output shaft 242. The cam 226 is composed of a plurality (three in the illustration) of cam angles 226a . . . which are arranged in an equally spaced relation in the circumference of the output shaft 242 so that the pushrod 27 may be forcibly moved plural times every rotation of the output shaft 42.

Accordingly, in the second embodiment, the gear unit is omitted, and the output shaft 242 is rotated at the same speed as the wheel 2f. Despite this, a plurality of cam angles 226a . . . are provided, and the pump 16 is reciprocated at frequencies plural times (three times in the illustrated embodiment) of those of the output shaft 242. Thereby the pressure oil may be supplied quickly to the hydraulic control chamber 18. The chamber 18 is increased in pressure rapidly, and the braking force is restored immediately.

As described above, according to the second embodiment, the accelerating gear unit may be omitted even if the pump 16 is being operated at a speed similar to that of the first embodiment. Therefore, the antilock controller may be further miniaturized.

What is claimed is:

1. A brake device for vehicles provided with an antilock controller which comprises a transmission device connected to a wheel; a sensor having a flywheel driven by said transmission device and sensing, by an overrunning rotation of the flywheel, a state of the wheel being about to lock during braking by a wheel brake, to produce an output signal; a hydraulic pump driven by the transmission device; a modulator which has a hydraulic control chamber communicated with an outlet chamber of the hydraulic pump and is interposed in a braking oil passage between a master cylinder and the wheel brake to reduce and restore a braking hydraulic pressure of the wheel brake in response to a decrease and increase in pressure of the hydraulic control chamber; and a normally closed type exhaust pressure valve interposed in a communicating passage between the hydraulic control chamber and an oil reservoir, the valve being opened upon receipt of the output signal from the sensor, wherein said transmission device and said sensor are accommodated within a space between an axle and a hub of the wheel, a cylindrical output shaft of the transmission device is rotatably supported on the outer periphery of the axle which supports the hub, said flywheel being supported on the outer periphery of said output shaft so as to be rotatable overrunningly, and a cam for driving said pump is formed on the outer periphery of said shaft adjacently to the flywheel.

2. The brake device of claim 1, wherein said transmission device comprises an accelerating gear unit adapted to accelerate and drive said output shaft from an input member connected to the wheel.

3. The brake device of claim 1, wherein said cam comprises a plurality of cam angles provided in an equally spaced relation in the circumference of said output shaft.

4. The brake device of claim 3, wherein said cam is provided at one end in an axial direction of said output shaft, said output shaft being connected at the other end in its axial direction to said hub.

5. The brake device of claim 3 or 4, wherein said output shaft is driven so that the output shaft is rotated at the same speed as that of the wheel.

6. The brake device of claim 4, wherein said output shaft is driven so that the output shaft is rotated at the same speed as that of the wheel.

* * * * *